United States Patent
Sandstrom (10) Patent No.: US 7,387,143 B2
(45) Date of Patent: **\*Jun. 17, 2008**

(54) TIRE FILLED WITH RECYCLED AND CURABLE ELASTOMERIC MATERIAL AND METHOD

(75) Inventor: Paul Harry Sandstrom, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 353 days.

This patent is subject to a terminal disclaimer.

(21) Appl. No.: 11/224,460

(22) Filed: Sep. 12, 2005

(65) Prior Publication Data

US 2007/0056668 A1 Mar. 15, 2007

(51) Int. Cl.
*B60C 19/00* (2006.01)
*B60C 19/12* (2006.01)
*B60C 7/00* (2006.01)

(52) U.S. Cl. .................. 152/246; 152/310; 152/311; 152/196

(58) Field of Classification Search .................. 152/155, 152/157, 158, 195, 196, 246, 310, 311, 312, 152/313
See application file for complete search history.

(56) References Cited

U.S. PATENT DOCUMENTS

| | | | |
|---|---|---|---|
| 3,022,810 A | | 2/1962 | Lambe |
| 3,381,735 A | | 5/1968 | Talcott et al. |
| 3,650,865 A | | 3/1972 | Hawkes et al. |
| 3,872,201 A | | 3/1975 | Paul et al. |
| 4,060,578 A | | 11/1977 | Kisbany |
| 4,383,566 A | * | 5/1983 | Houghton .................. 152/158 |
| 5,681,411 A | * | 10/1997 | O'Coin ....................... 156/112 |
| 6,568,443 B2 | | 5/2003 | Shoner |
| 6,623,580 B2 | | 9/2003 | McMahon et al. |
| 6,779,572 B2 | | 8/2004 | Tabor et al. |

FOREIGN PATENT DOCUMENTS

JP 2004-358805 * 12/2004

* cited by examiner

*Primary Examiner*—Justin Fischer
(74) *Attorney, Agent, or Firm*—Wood, Herron & Evans LLP (57) ABSTRACT

A first tire having a cavity filled with cured and foamed elastomeric material and a recycled foamed elastomeric material. The recycled foamed elastomeric material was removed from a second tire for recycling in the first tire.

20 Claims, 10 Drawing Sheets

TIRE FILLED WITH RECYCLED AND CURABLE ELASTOMERIC MATERIAL AND METHOD

CROSS REFERENCES TO RELATED APPLICATIONS

This application is related to U.S. patent application Ser. No. 11/159,953 filed on Jun. 23, 2005 by George F. Balogh et al. and entitled TIRE CONTAINING CELLULAR RUBBER WITHIN ITS TIRE CAVITY, which application is hereby incorporated by reference herein in its entirety.

This application is further related to a U.S. patent application filed on even date herewith by Paul H. Sandstrom et al. and entitled VEHICLE WHEEL MADE WITH PRECURED ELASTOMERIC MATERIAL AND METHOD, which application is hereby incorporated by reference herein in its entirety.

This application is further related to a U.S. patent application filed on even date herewith by Paul H. Sandstrom et al. and entitled TIRE FILLED WITH CORE AND CURABLE ELASTOMERIC MATERIAL AND METHOD, which application is hereby incorporated by reference herein in its entirety.

FIELD OF THE INVENTION

This invention relates generally to vehicle tires and more particularly, to foam filled tires.

BACKGROUND OF THE INVENTION

Foam filled tires are especially useful in applications involving industrial and off-the-road vehicles, where it is essential to maintain the vehicles in service, since time lost for repairs is very costly. It is known to fill tires with a curable and foamable elastomeric material, which, after heat curing, expands to a closed cell foam rubber composition that provides an operating pressure within the tire. Such foam filled tires are substantially deflation proof and almost indestructible from normal hazards, for example, bolts, nails, large holes, jagged curbs, sharp rocks, deep water, etc. Thus, foam filled tires substantially reduce the time such vehicles are down for repairs.

Examples of filled tires are shown and described in U.S. Pat. Nos. 3,022,810, 3,381,735, 3,650,865, 3,872,201, 4,060,578 and 6,623,580. U.S. Pat. No. 3,650,865 provides one example of filling a tire cavity with a curable and foamable elastomeric material to pressurize the tire. U.S. Pat. Nos. 3,650,865 and 6,623,580 describe methods of making a foam filled tire by inserting layers of a curable and foamable elastomeric material within a cured tire. The tire is heated to cure the curable and foamable elastomeric material contained therein. The heat curing process can be performed either before, or after, the tire is mounted on a rim. Heating causes the layers of the curable and foamable elastomeric material to expand and form a closed cell foam rubber composition that provides an internal tire pressure.

Tires filled with such a curable and foamable elastomeric material have a damping similar to that of a pneumatic tire and thus, provide a pneumatic-like ride, which is especially important with unsprung off-the-road vehicles. Further, the performance of such foam filled tires is often superior to the performance of tires filled with other materials. However, tires filled with the curable and foamable elastomeric material are more expensive to produce and thus, such foam filled tires suffer a cost disadvantage.

Therefore, there is a need for an improved foam filled tire and method of manufacture that reduces the cost of making a tire filled with a closed cell foam rubber composition.

SUMMARY OF THE INVENTION

The present invention provides a foam filled tire using an elastomeric material, which is substantially less expensive to make and does not compromise performance advantages of such a tire. The foam filled tire of the present invention fills a new tire with both recycled foamed elastomeric material removed from another foam filled tire and new, curable and foamable elastomeric material. By using recycled foamed elastomeric material, the cost of manufacturing a foam filled tire is substantially reduced. The tire of the present invention is especially useful in manufacturing industrial and off-the-road vehicles.

More specifically, in one first embodiment, the invention provides a tire having a cured and foamed elastomeric material in a tire cavity along with a recycled foamed elastomeric material a cavity. The recycled foamed elastomeric material has been removed from another tire for recycling.

In one aspect of the invention, layers of the recycled foamed elastomeric material are layered with layers of the cured and foamed elastomeric material to substantial fill the cavity. In another aspect of the invention, the layers of recycled foamed elastomeric material and the layers of cured and foamed elastomeric material can be in the form of strips of elastomeric material that extend in a circumferential direction with respect to a tire centerline, discs of elastomeric material that are substantially perpendicular to the tire centerline or radial slices of elastomeric material that are positioned circumferentially with respect to the tire centerline.

In another embodiment, the invention provides a method of filling a cured tire by first removing a cured and foamed elastomeric material from another existing tire and then, cutting the cured and foamed elastomeric material to provide a piece of recyclable foamed elastomeric material. Thereafter, the piece of recyclable foamed elastomeric material is placed inside a cavity of the cured tire along with a piece of curable and foamable elastomeric material. Thereafter, the piece of curable and foamable elastomeric material is cured to substantially fill the cavity of the cured tire with a closed cell foam rubber composition.

These and other objects and advantages of the present invention will become more readily apparent during the following detailed description taken in conjunction with the drawings herein.

DEFINITIONS

"Elastomeric material" means a generally elastic, heat curable material that has a rubber or synthetic rubber base, for example, a PERMAFOAM elastomeric material commercially available from The Goodyear Tire and Rubber Company, which upon curing, provides a closed cell foam rubber composition.

"Curable and foamable elastomeric material" means an uncured elastomeric material.

"Cured and foamed elastomeric material" means a closed cell foam rubber composition produced by curing an elastomeric material in a cavity of a cured tire.

"Recyclable (recycled) foamed elastomeric material" means a cured and foamed elastomeric material that has been removed from a tire for recycling.

"Foam filled tire" means a tire having an interior cavity filled with at least a closed cell foam rubber composition produced by curing an elastomeric material.

DETAILED DESCRIPTION OF THE INVENTION

Figure 1:
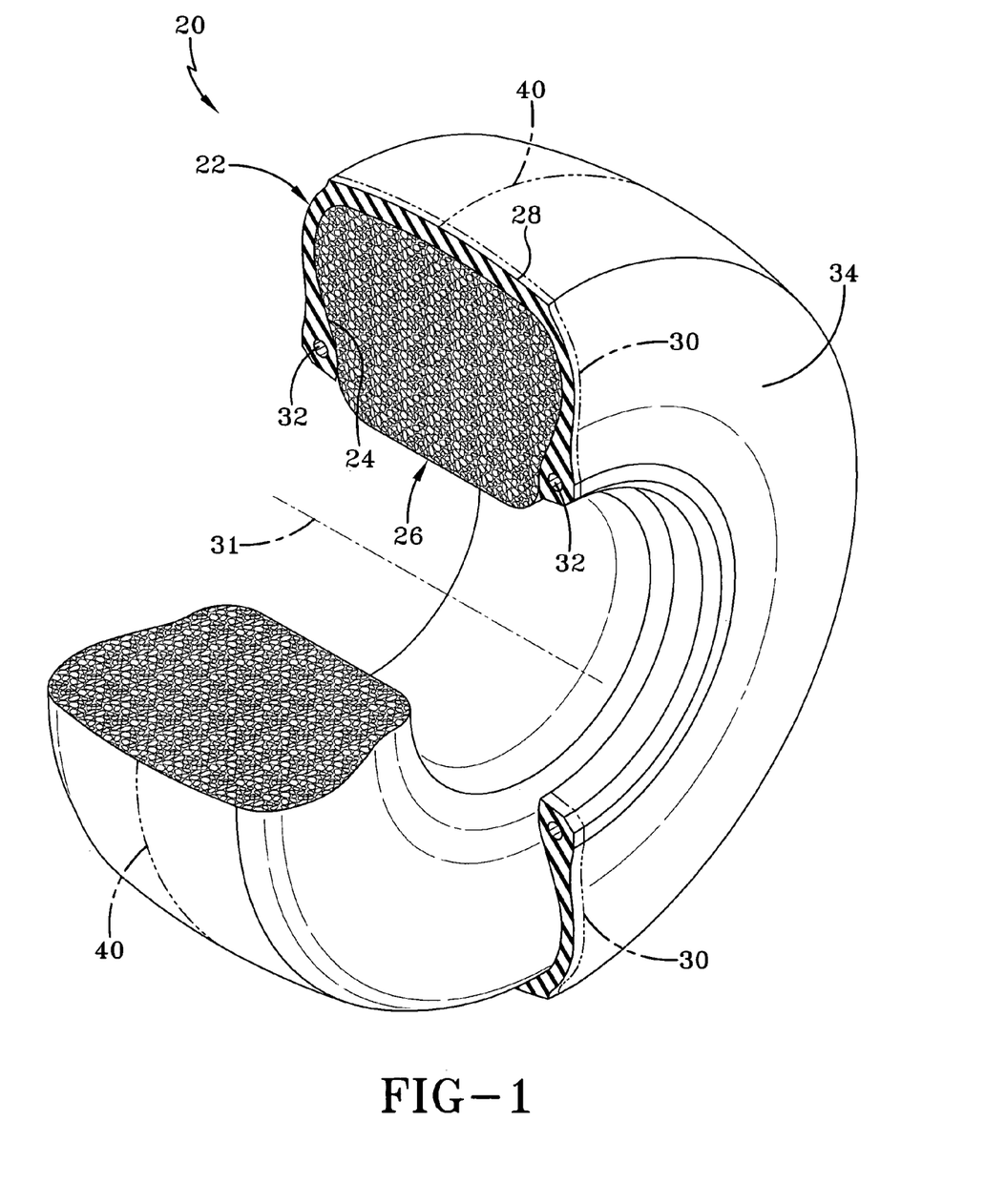
FIG. 1 is a cross-sectional view of an existing foam filled tire.

Referring to FIG. 1, a foam filled used tire 20 has a casing 22 surrounding a generally toroidal cavity 24. Within the cavity 24 is a closed cell foam rubber composition 26 that was produced by heat curing a curable and foamable elastomeric material in a known manner. Such a material may be a PERMAFOAM elastomeric material commercially available from The Goodyear Tire and Rubber Company. In the exemplary embodiment of FIG. 1, the foam filled used tire 20 has a tread portion 28 that is worn to a smooth surface. A tire in the condition illustrated in FIG. 1 is no longer usable and would be disposed of in a normal course of business.

Even though the tire tread 28 has experienced wear and the used tire 20 is no longer useful, the inner foam rubber composition 26 is not significantly worn or damaged; and it is still fully functional as foam fill for a tire. However, to further use the foam rubber composition 26, it must be removed from the tire casing 22. To do this, the tire casing 22 is cut into at least two parts. In one process, the casing 22 may be cut in a plane that is generally parallel to a tire centerline 31 and along a cut line 30 that extends through the beads 32, sidewalls 34 and tread portion 28 between the sidewalls 34. In another example, the used tire 20 may be cut in a plane that is generally perpendicular to the tire centerline 31 and along a cut line 40 that extends through the tread portion 28. In either event, pressure from the closed cell foam rubber composition 26 within the used tire 20 causes the tire casing 22 to pop or split apart when either of the cut lines 30 or 40 extend fully through a thickness of the used tire 20.

Figure 2:
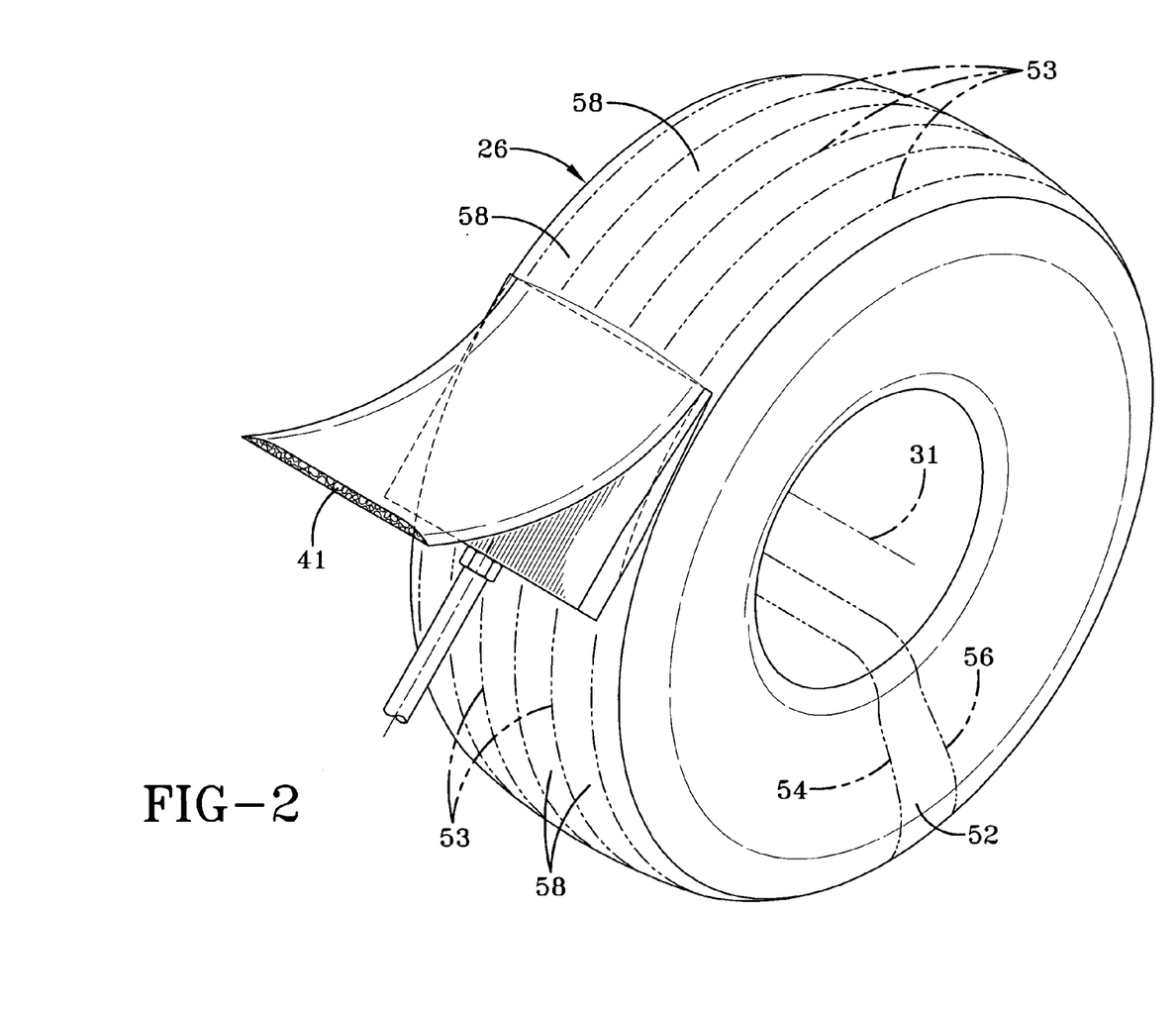
FIG. 2 is a view of a recyclable foamed elastomeric material removed from the existing tire of FIG. 1.

After being cut into two or more sections, the tire casing 22 can be readily separated from the closed cell foam rubber composition 26 leaving a formed foam rubber composition as illustrated in FIG. 2. Thus, the formed foam rubber composition of FIG. 2 is a cured and foamed elastomeric material that does not require further curing and has substantially all of the same performance advantages that it had when it was originally cured in the used tire shown in FIG. 1. Thus, for the minimal cost of retrieving the foam rubber composition 26 of FIG. 2, a cured and foamed elastomeric material is made available for recycling and use in another cured tire. However, in order to utilize the foam rubber composition 26, it must be cut into a plurality of pieces. In one example, the foam rubber composition 26 can be cut circumferentially to provide pieces of a recyclable foamed elastomeric material 41 that permits them to be inserted in a new cured tire 42 illustrated in FIG. 3.

Figure 3:
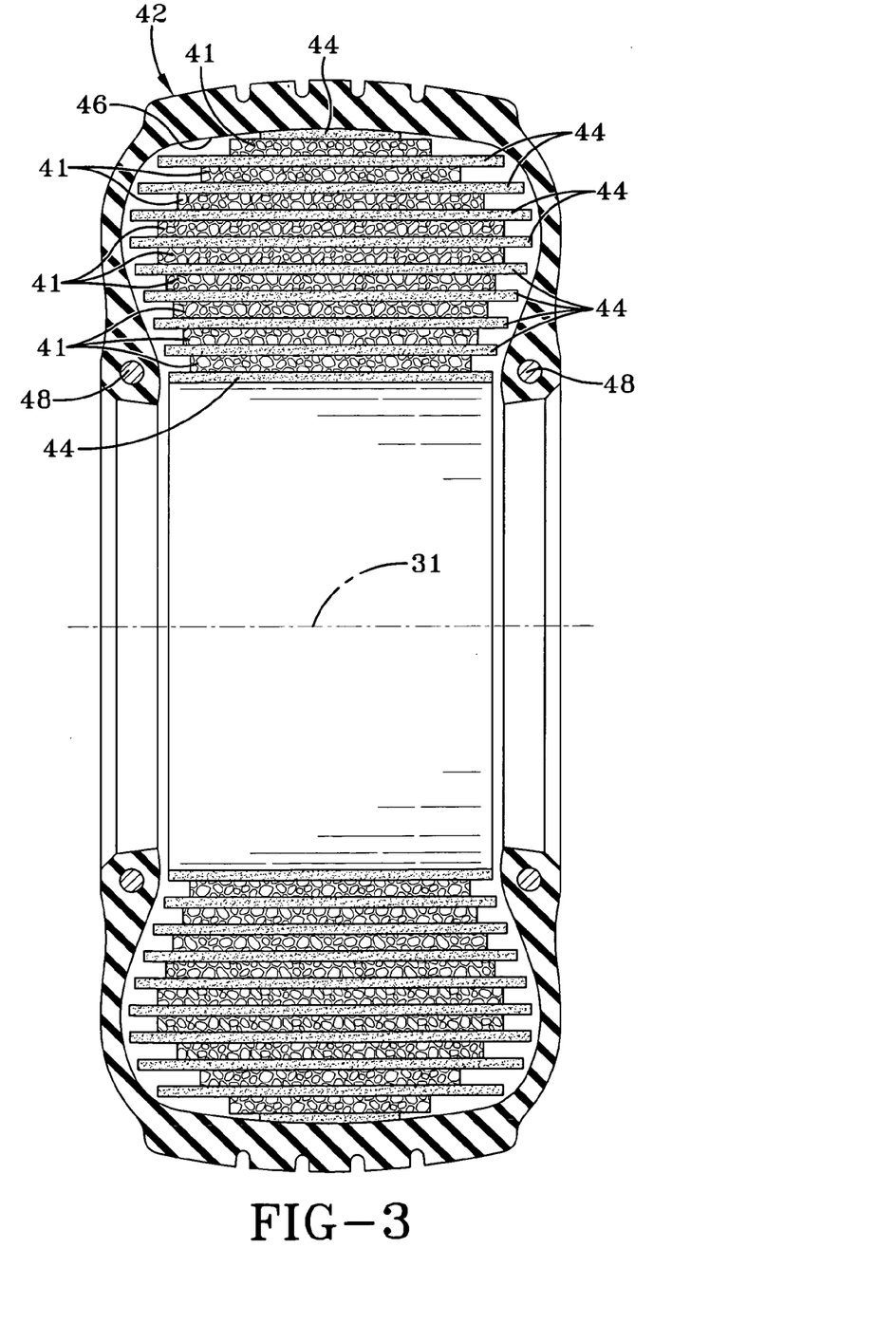
FIG. 3 is a cross-sectional view of one embodiment of a new cured tire that is filled with layers of the recycled foamed elastomeric material shown in FIG. 2 and uncured layers of curable and foamable elastomeric material in accordance with the principles of the present invention.
Figure 3A:
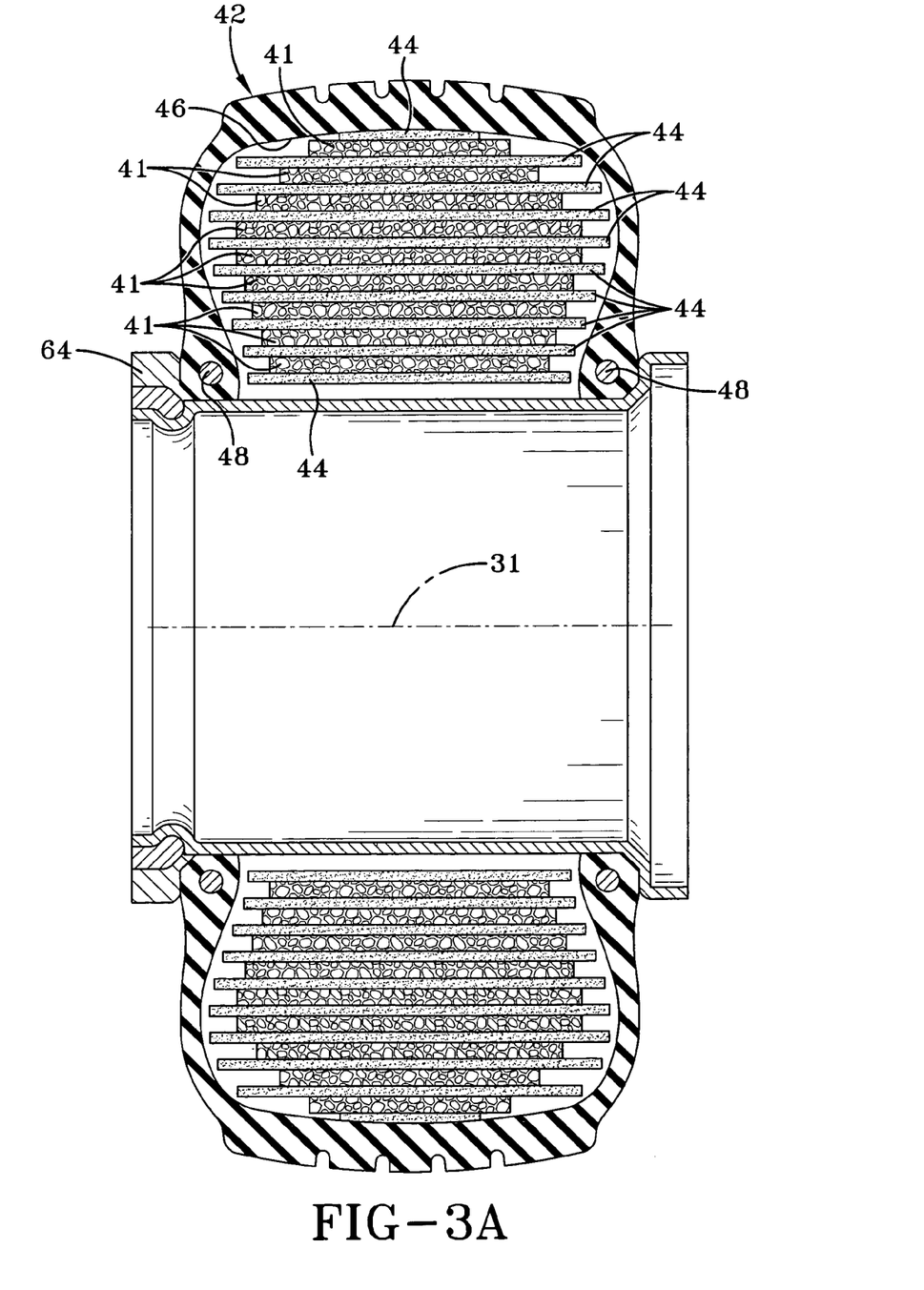
FIG. 3A is a cross-sectional view of the tire of FIG. 3 mounted on a wheel rim with the uncured layers of curable and foamable elastomeric material.

The material 41 can be cut to any desired length, for example, a length that is equal to, less than, or greater than, a length of a circumference of the recycled foamed rubber composition 26. Thus, when strips of the recyclable foamed elastomeric material 41 are situated in the new tire 42, the strips can be placed end-to-end, or a single strip can overlap itself in a spiral. In this embodiment, pieces of curable and foamable elastomeric material 44 are placed in a circumferential direction inside a generally toroidal shaped open cavity 46 of the new tire 42 in alternate layers with the recycled foamed elastomeric material 41 that have been cut or sliced from the foam rubber composition 26 of FIG. 2. The recycled foamed elastomeric material 41 and curable and foamable elastomeric material 44 may be cut or formed into strips that vary in thickness and width depending on the size of the new tire 42. For example, the strips may vary in thickness in a range of from about 0.5 cm (about 0.2 inch) to about 2.5 cm (about 1 inch) thick. However, strips of greater thickness, for example, about 5-61 cm (about 2-24 inches), are more practical for large earth-mover tires. Typically, the thickness of the strips is relatively thin compared to the depth of the cavity 46, such that a number of layers are required to fill the cavity 46.

The successive layers of material 41, 44 may be equal or unequal in thickness and width; and if further material is needed, a separate compensator strip can be used. The number of alternate layers of recycled foamed elastomeric material 41 and curable and foamable elastomeric material 44 is essentially application dependent and determined experimentally on a tire-by-tire basis. Thus, the recycled foamed elastic material 41 and curable and foamable elastomeric material 44 are cut into lengths that can be readily handled and used depending on the nature of the insertion and layering process.

In a known manner, the new tire 42 can be fixtured with clamps (not shown) that hook over, and spread, beads 48 to provide greater access to the tire cavity 46. Further, as is known, after several layers have been applied, they can be compressed in a radially outward direction utilizing a pneumatic inner tube (not shown) or other compression device. The quantity of curable and foamable elastomeric material 44 used is related to the density of the materials 41, 44 and the blowing agent used.

The tire 42 can be mounted on a mandrel (not shown) and placed in a curing oven to cure the curable and foamable elastomeric material strips 44 as shown and described in U.S. Pat. No. 6,623,580, the entirety of which is hereby incorporated by reference herein. The curable and foamable elastomeric material strips 44 can be cured in any known manner, for example, as shown and described U.S. Pat. No. 3,872,201, entitled METHOD OF CURING FOAM INFLATED TIRES; and the entireties of which are hereby incorporated by reference herein.

Figure 4:
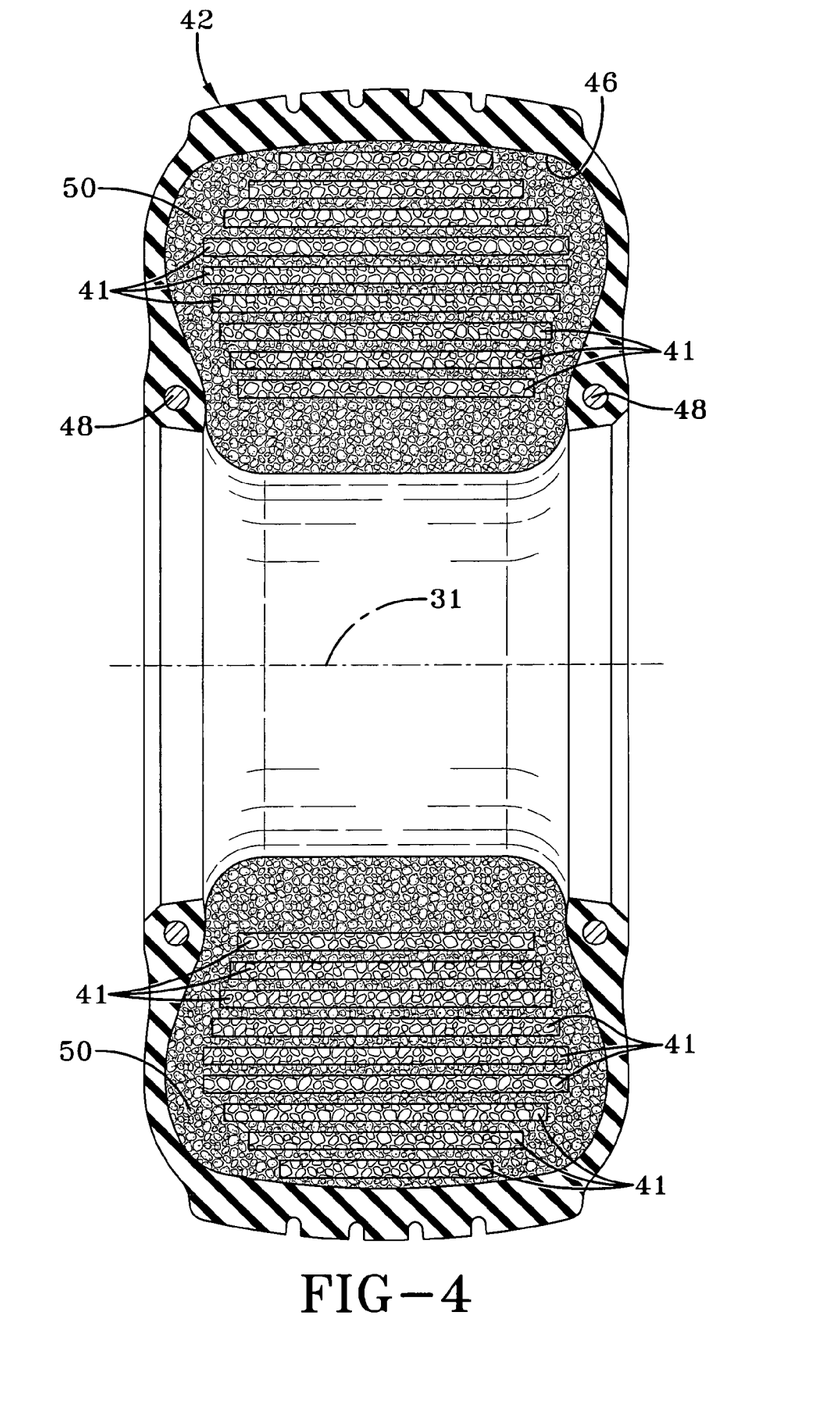
FIG. 4 is a cross-sectional view of the tire of FIG. 3 after heat curing the layers of curable and foamable elastomeric material.
Figure 4A:
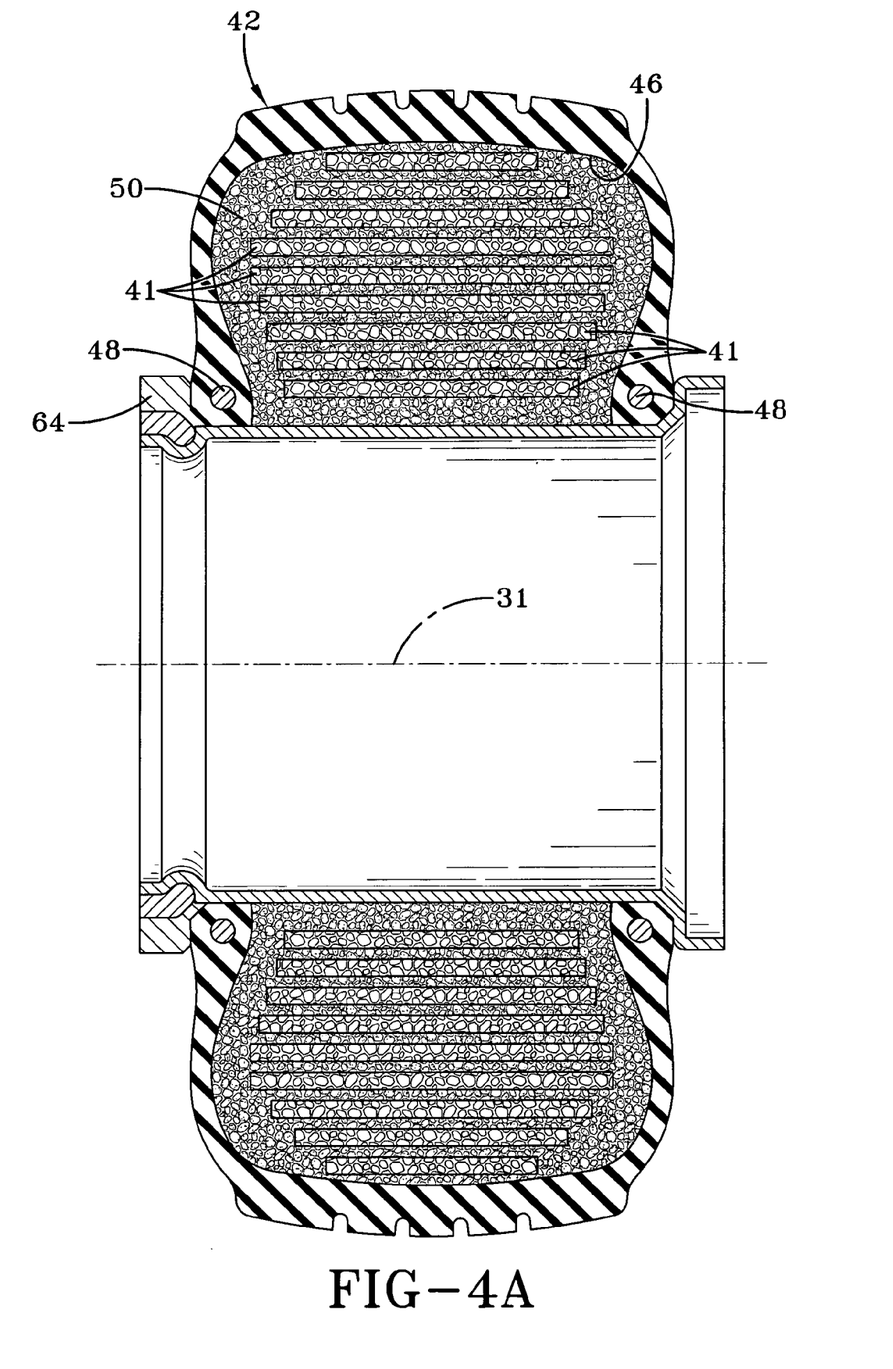
FIG. 4A is a cross-sectional view of the tire of FIG. 3 after heat curing the curable and foamable elastomeric material and mounting the tire on a wheel rim.

As shown in FIG. 4, with any of the known heat curing processes, the curable and foamable elastomeric material strips 44 flow into voids and spaces in the cavity 46 and expand into a cured and foamed elastomeric material 50. Thus, the cured and foamed elastomeric material 50 and the recycled foamed elastomeric material 41 substantially fill the cavity 46. Further, upon being removed from the mandrel, the cured and foamed elastomeric material 50 expands radially inward beyond the beads 48, so that upon being mounted on a rim 64 as shown in FIG. 4A, the cured and foamed elastomeric material 50 pressurizes the tire 42 in a known manner.

In a further embodiment, the new cured tire 42 can be mounted onto a wheel rim 64 and placed in a curing oven to cure the curable and foamable elastomeric material strips 44 as shown and described in U.S. Pat. No. 3,650,865, the entirety of which is hereby incorporated herein by reference. Again, the curable and foamable elastomeric material strips 44 flow into the spaces and expand into a cured and foamed elastomeric material 50, which along with the recycled foamed elastomeric material substantially fills the cavity 46 as shown in FIG. 4A.

Figure 5:
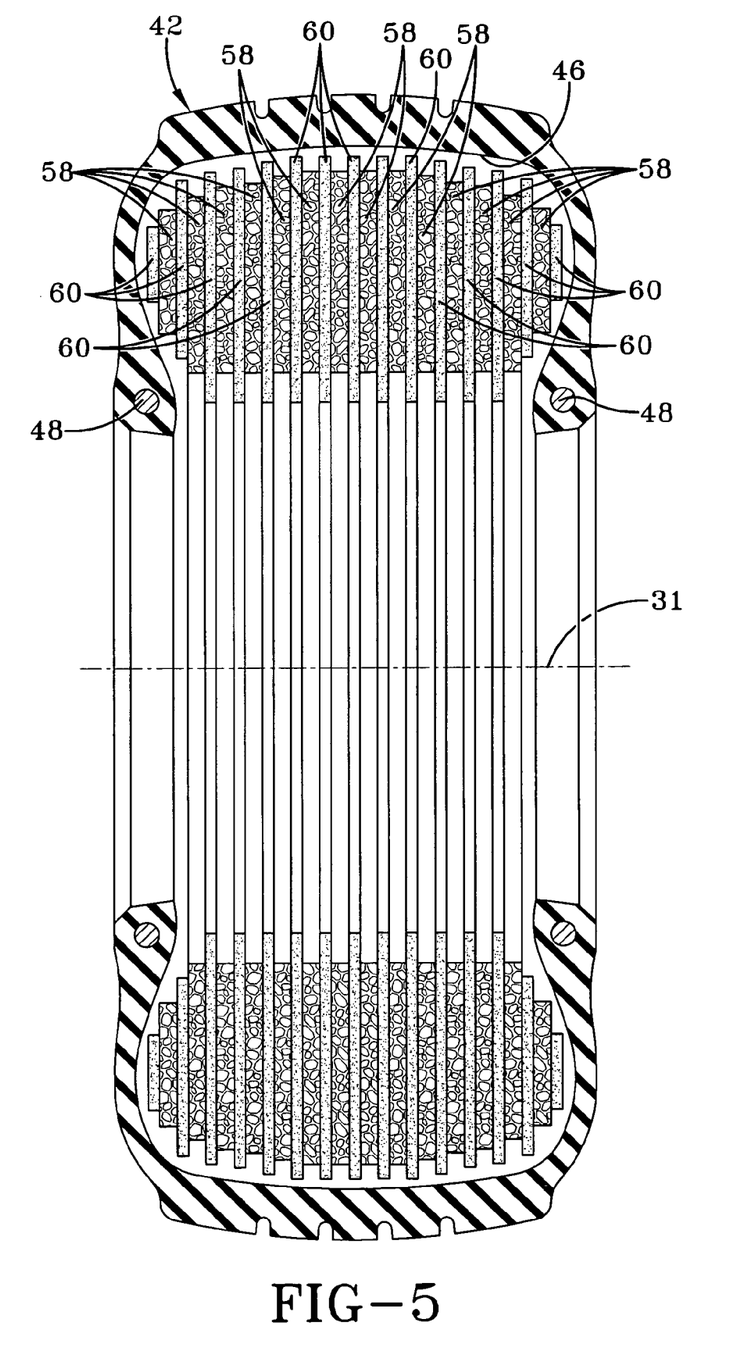
FIG. 5 is a cross-sectional view of another embodiment of a new cured tire filled with layers of the recycled foamed elastomeric material shown in FIG. 2 and layers of curable and foamable elastomeric material in accordance with the principles of the present invention.

In the embodiments of FIGS. 3, 3A and 4, 4A, the layers of recyclable foamed elastomeric material 41 and layers of curable and foamable elastomeric material 44 are positioned in a generally circumferential direction inside the cured tire 42. Referring to FIG. 2, in an alternative embodiment, the foam rubber composition 26 may be cut along lines 53 in a direction generally perpendicular to the centerline 31 to provide annular flat discs of recyclable foamed material 58. The discs of recyclable foamed material 58 are cut to a thickness that permits them to be bent and manipulated, so that, as shown in FIG. 5, they can be placed inside the cavity 46 in a direction generally perpendicular to the tire centerline 31. Alternately, the discs of recyclable foamed material 58 can be cut thicker and segmented, so that they can be placed inside the new tire 42. The discs of recyclable foamed material 58 are alternately layered in the new tire with discs of curable and foamable elastomeric material 60.

Figure 6:
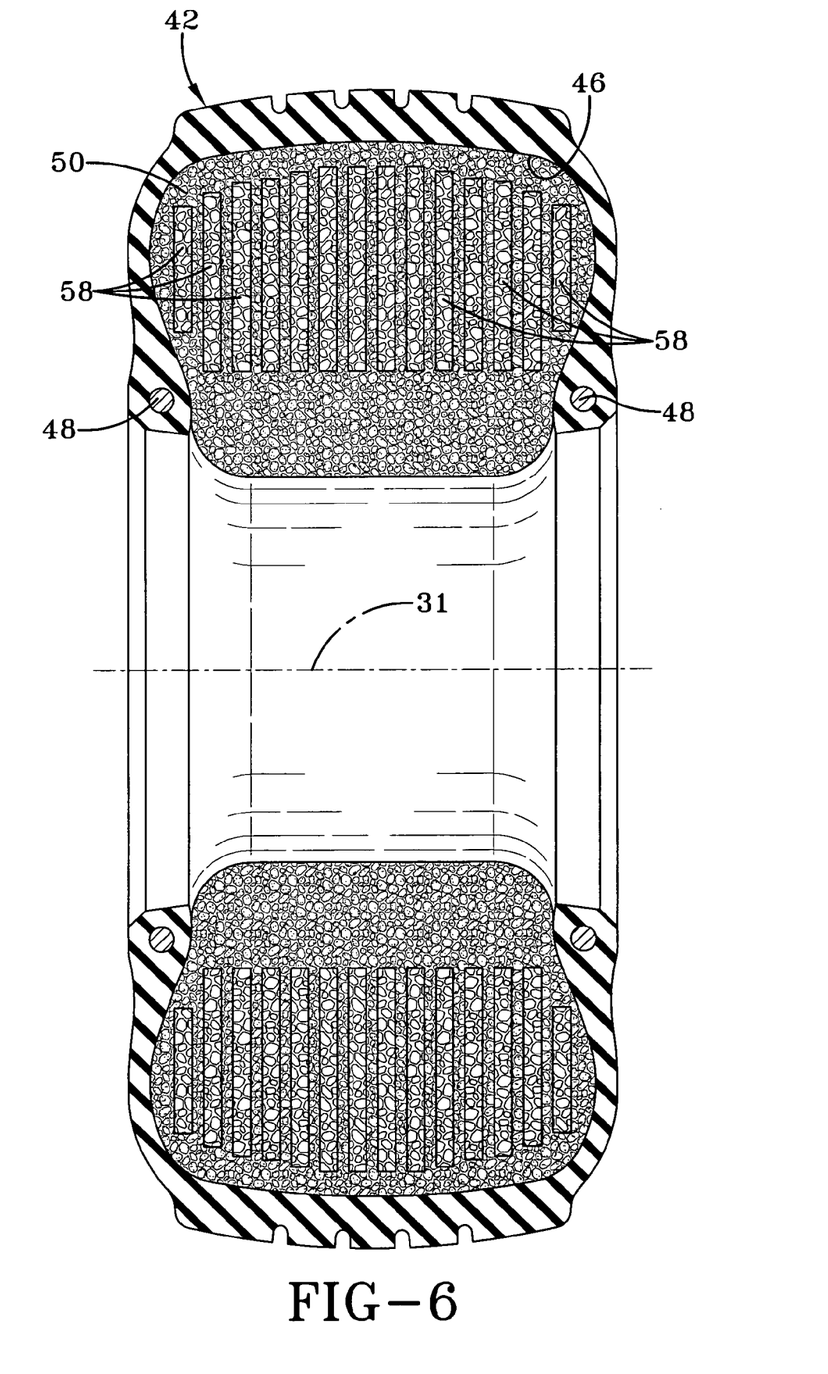
FIG. 6 is a cross-sectional view of the tire of FIG. 5 after heat curing the curable and foamable elastomeric material.

Upon heat curing the discs of curable and foamable material 60, either on a mandrel or on a rim, with any of the known heat curing processes, the elastomeric material 60 flows into the spaces and expands into a cured and foamed elastomeric material 50 as shown in FIG. 6. Thus, voids and spaces in the cavity 46 of the new tire 42 are filled with a cured and foamed elastomeric material 50, which along with the discs of recyclable foamed material 58 substantially fills the cavity 46.

Figure 7:
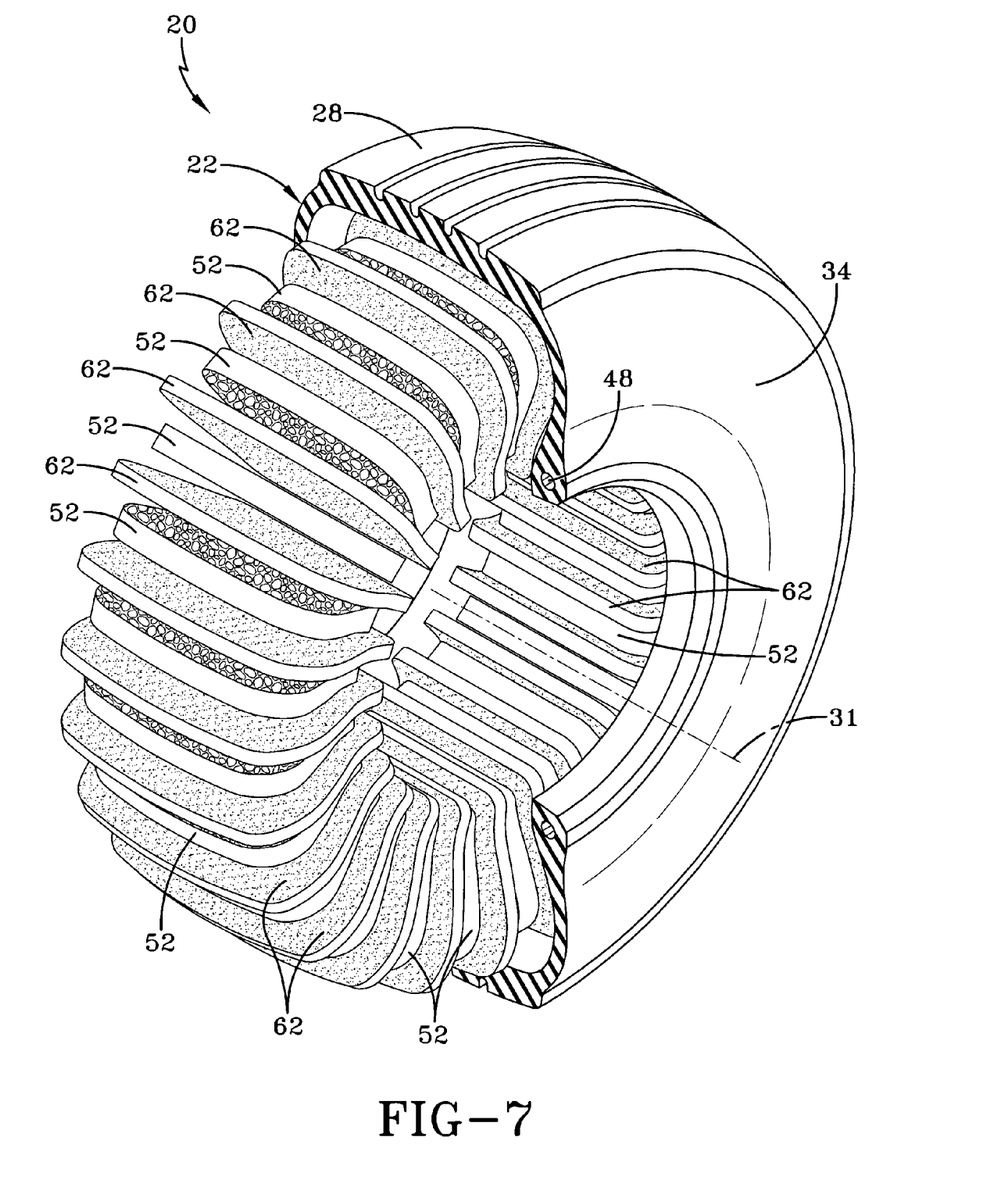
FIG. 7 is a cross-sectional view of another embodiment of a new cured tire filled with layers of the recycled foamed elastomeric material shown in FIG. 2 and layers of curable and foamable elastomeric material in accordance with the principles of the present invention.

Referring to FIG. 2, in another alternative embodiment, the foam rubber composition 26 may be cut radially along lines 54, 56 to provide slices of recyclable foamed material 52. The slices of recyclable foamed material 52 are cut to a thickness that is suitable for the application and is often experimentally determined. As shown in FIG. 7, the discs of recyclable foamed material 52 are alternately layered in a new cured tire 42 in a generally radial direction with slices of curable and foamable elastomeric material 62.

Figure 8:
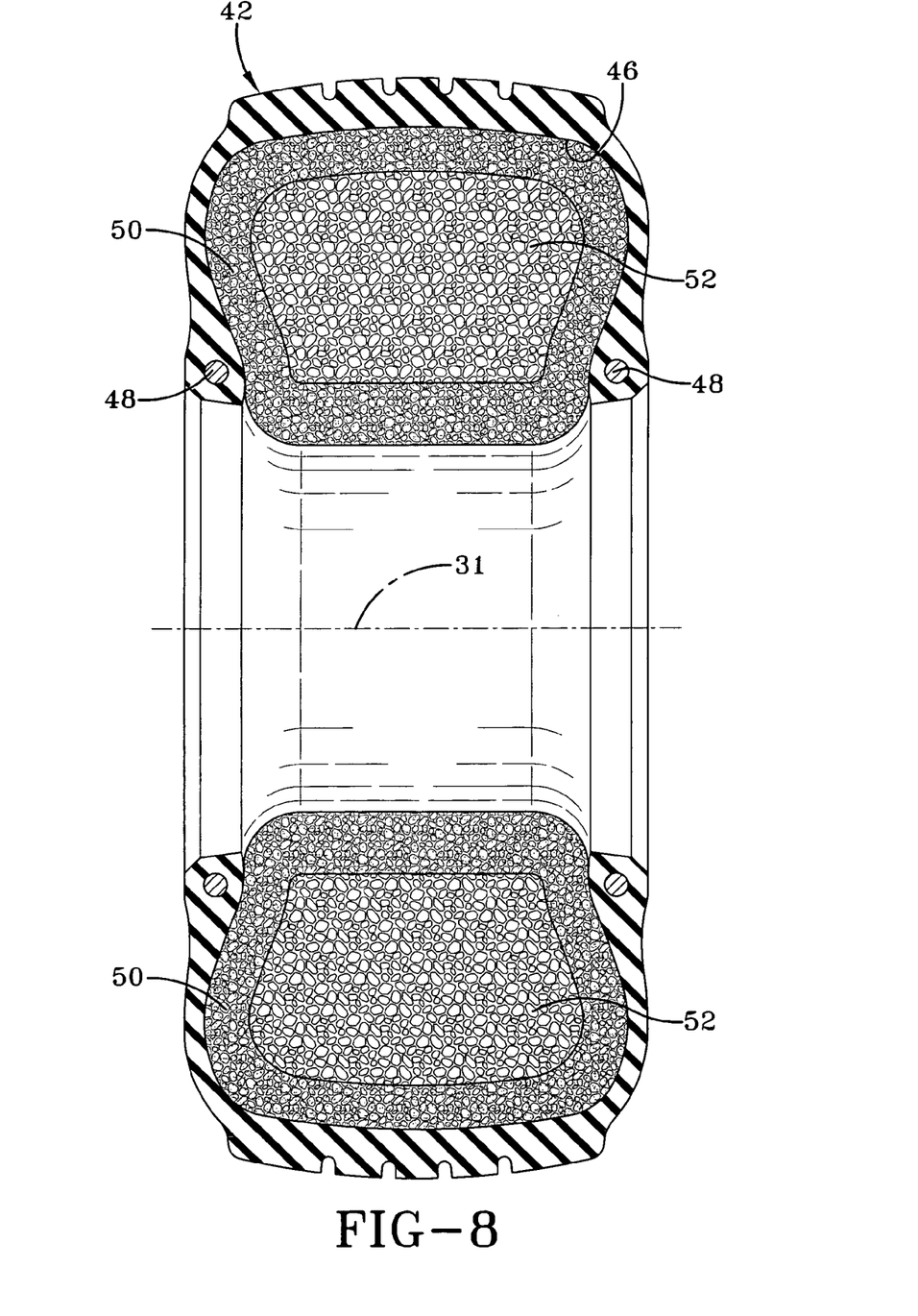
FIG. 8 is a cross-sectional view of the tire of FIG. 7 after heat curing the curable and foamable elastomeric material.

Upon heat curing the slices of curable and foamable elastomeric material 62, either on a mandrel or a rim, with any of the known heat curing processes, the elastomeric material 62 flows into the spaces and expands into a cured and foamed elastomeric material 50 as shown in FIG. 8. Thus, voids and spaces in the cavity 46 of the new tire 42 are filled with a cured and foamed elastomeric material 50, which along with the discs of recyclable foamed material 52 substantially fills the cavity 46.

The foam filled new cured tire 42 is made from both, recycled foamed elastomeric material removed from an existing foam filled tire and new, curable and foamable elastomeric material. By using recycled foamed elastomeric material, advantageously, the cost of manufacturing a foam filled tire is substantially reduced over a tire not using a recycled foamed elastomeric material without any substantive loss in tire performance. The tire of the present invention is especially useful in manufacturing industrial and off-the-road vehicles.

While the present invention has been illustrated by a description of various embodiments and while these embodiments have been described in considerable detail, it is not the intention of Applicants to restrict or in any way limit the scope of the appended claims to such detail. Additional advantages and modifications will readily appear to those skilled in the art. For example, in the described embodiment, the used tire 20 is one example of recycling the foam rubber composition 26. In other embodiments, other tires filled with a foam rubber composition may be used, for example, tires that fail a quality inspection because of a manufacturing defect in the casing or tread, or tires that have been returned to a manufacturer prior to the end of their useful life but cannot be resold, etc.

In the described embodiments of FIGS. 3-8, the various layers or pieces of recycled foamed elastomeric material and curable and foamable elastomeric material are shown abutted against each other without any spacing. It should be noted that the drawings are schematic in nature; and in practice, adjacent layers or pieces of elastomeric material may have spaces between them. Further, the various embodiments illustrate the pieces and layers of elastomeric material with a particular orientation with respect to the tire centerline. However, again, in practice, precise orientations of the pieces and layers of elastomeric material are not required; and the pieces and layers of elastomeric material may have an oblique orientation with the tire centerline.

In addition, the various embodiments illustrate the curable and foamable elastomeric material being cut as strips, discs or slices; however, again, in practice, the curable and foamable elastomeric material can take other forms depending on the application. For example, the curable and foamable elastomeric material can be formed into one or more beads or a rope and inserted between the pieces of recycled foamed elastomeric material.

In a still further embodiment, the recycled foamed elastomeric material can be cut, chopped or ground into smaller pieces of foamed particulates that are mixed with the curable and foamable elastomeric material. A cavity of a cured tire is automatically or manually partially filled with a mix of foamed particulates and curable and foamable elastomeric material. The curable and foamed elastomeric material is then heat cured, either on or off a wheel rim, in a known manner to substantially fill the cavity with a closed cell foam rubber composition. The relative quantities of foamed particulates to curable and foamable elastomeric material is essentially application dependent and determined experimentally on a tire-by-tire basis. Further, the quantity of curable and foamable elastomeric material used is related to the density of the materials and the blowing agent used.

Therefore, the invention in its broadest aspects is not limited to the specific details shown and described. Consequently, departures may be made from the details described herein without departing from the spirit and scope of the claims which follow.

What is claimed is:

1. A cured tire having a cavity wall defining a cavity therein and comprising:

a first material portion in the cavity comprising a plurality of recycled foamed elastomeric material pieces removed from another tire and spaced from the cavity wall a first distance; and
   a second material portion in the cavity comprising a plurality of cured and foamed elastomeric material pieces alternately arranged with the recycled foamed elastomeric material pieces and spaced from the cavity wall a second distance that is less than the first distance of an adjacent one of the recycled foamed elastomeric pieces; and
   wherein the cured and foamed elastomeric material pieces bond to the recycled foamed elastomeric pieces and flow to bond with the cavity wall and fill the cavity when cured.

2. The cured tire of claim 1 wherein the first material portion and the second material portion substantially fill the cavity.

3. The cured tire of claim 1 wherein the plurality of recycled foamed elastomeric material pieces comprises strips of the recycled foamed elastomeric material, the strips being placed in the cavity in circumferential arcs about a tire centerline.

4. The cured tire of claim 1 wherein the plurality of cured and foamed elastomeric material pieces comprises strips of the cured and foamed elastomeric material, the strips being placed in the cavity in circumferential arcs about the tire centerline.

5. The cured tire of claim 4 further comprising a casing and a tread portion and one of the plurality of cured and foamed elastomeric material pieces being positioned in the cavity immediately adjacent the casing and below the tread portion.

6. The cured tire of claim 1 wherein the plurality of recycled foamed elastomeric material pieces comprises discs of the recycled foamed elastomeric material, the discs being placed in the cavity in a direction substantially perpendicular to a tire centerline.

7. The cured tire of claim 1 wherein the plurality of cured and foamed elastomeric material pieces comprises discs of the cured and foamed elastomeric material, the discs being placed in the cavity in a direction substantially perpendicular to the tire centerline.

8. The cured tire of claim 1 wherein the plurality of recycled foamed elastomeric material pieces comprises radial slices of the recycled foamed elastomeric material, the radial slices being placed in the cavity circumferentially with respect to a tire centerline.

9. The cured tire of claim 1 wherein the plurality of cured and foamed elastomeric material pieces comprises radial slices of the cured and foamed elastomeric material, the radial slices being placed in the cavity circumferentially with respect to the tire centerline.

10. A cured tire having a cavity wall defining a cavity therein and comprising:
   a plurality of first material portions in the cavity comprising a recycled foamed elastomeric material produced by removing a cured and foamed elastomeric material from another tire and cutting the cured and foamed elastomeric material to provide the first material portions of recyclable foamed elastomeric material; and
   second material portions in the cavity comprising a cured and foamed elastomeric material, the second material portions alternately layered with the first material portions and positioned so that the second material portions substantially encapsulate the first material portions from contacting the cavity wall.

11. The cured tire of claim 10 wherein the first material portions and the second material portions substantially fill the cavity.

12. A method of filling a cured tire comprising:
   removing a cured and foamed elastomeric material from another tire;
   cutting the cured and foamed elastomeric material into a plurality of pieces of recyclable foamed elastomeric material;
   placing the pieces of recyclable foamed elastomeric material in alternating arrangement with pieces of curable and foamable elastomeric material arranged inside the cavity of the cured tire in position to flow and contact the cured tire; and
   curing the pieces of curable and foamable elastomeric material to provide a closed cell foam rubber composition comprising recycled and non-recycled elastomeric material.

13. The method of claim 12 wherein curing the pieces of curable and foamable elastomeric material substantially fills the cavity of the cured tire with a closed cell foam rubber composition.

14. The method of claim 12 wherein before curing, the method further comprises mounting the cured tire on a rim.

15. The method of claim 12 wherein placing a piece of curable and foamable material and placing a piece of recycle foamed material further comprises:
   locating a strip of curable and foamable elastomeric material inside a cavity of the cured tire in a circumferential arc about a centerline of the cured tire; and
   positioning a strip of recyclable foamed elastomeric material inside the cavity in a circumferential arc about the centerline and adjacent the strip of curable and foamable elastomeric material.

16. The method of claim 15 further comprising iterating the steps of locating and positioning to provide alternate strips of curable and foamable elastomeric material and strips of recyclable foamed elastomeric material.

17. The method of claim 12 wherein placing a piece of curable and foamable material and placing a piece of recycle foamed material further comprises:
   locating a disc of curable and foamable elastomeric material inside a cavity of the cured tire in a direction substantially perpendicular to a centerline of the cured tire;
   positioning a disc of recyclable foamed elastomeric material inside the cavity in a direction substantially perpendicular to the centerline and adjacent the disc of curable and foamable elastomeric material.

18. The method of claim 17 further comprising iterating the steps of locating and positioning to provide alternate discs of curable and foamable elastomeric material and discs recyclable foamed elastomeric material.

19. The method of claim 12 wherein placing a piece of curable and foamable material and placing a piece of recycle foamed material further comprises:
   locating a radial slice of curable and foamable elastomeric material inside a cavity of the cured tire in a radial direction with respect to a centerline of the cured tire;
   positioning a radial slice of recyclable foamed elastomeric material inside the cavity in a radial direction with respect to the centerline and adjacent the radial slice of curable and foamable elastomeric material.

20. The method of claim 19 further comprising iterating the steps of locating and positioning to provide alternate radial slices of curable and foamable elastomeric material and radial slices of recyclable foamed elastomeric material.

* * * * *

UNITED STATES PATENT AND TRADEMARK OFFICE
CERTIFICATE OF CORRECTION

PATENT NO. : 7,387,143 B2
APPLICATION NO. : 11/224460
DATED : June 17, 2008
INVENTOR(S) : Paul Harry Sandstrom It is certified that error appears in the above-identified patent and that said Letters Patent is hereby corrected as shown below:

Column 1:
Line 29, after "particularly", delete ","
Line 61, after "thus", delete ","
Line 66, after "thus", delete ","

Column 2:
Line 21, after "material", delete "a cavity"
Line 25, change "substantial" to --substantially--

Column 3:
Line 24, change "and" to --&--
Line 25, after "curing", delete ","
Line 48, change "and" to --&--

Column 4:
Line 67, after "described", insert --in--

Column 6:
Line 1, after "both", delete ","

Column 8:
Claim 15, line 26, change "recycle" to --recycled--
Claim 17, line 40, change "recycle" to --recycled--
Claim 18, line 50, after "discs", insert --of--
Claim 19, line 53, change "recycle" to --recycled--

Signed and Sealed this

Twenty-fourth Day of February, 2009

JOHN DOLL
*Acting Director of the United States Patent and Trademark Office*